US012617938B2

(12) United States Patent
Park et al.

(10) Patent No.: US 12,617,938 B2
(45) Date of Patent: May 5, 2026

(54) FIBRILLATED FIBER AND METHOD FOR PREPARING THE SAME

(71) Applicant: LG Chem, Ltd., Seoul (KR)

(72) Inventors: Minsung Park, Daejeon (KR); Su Hee Lee, Daejeon (KR); Nana Kang, Daejeon (KR); Kwang Seoung Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 495 days.

(21) Appl. No.: 17/767,750

(22) PCT Filed: May 31, 2021

(86) PCT No.: PCT/KR2021/006738
§ 371 (c)(1),
(2) Date: Apr. 8, 2022

(87) PCT Pub. No.: WO2021/242067
PCT Pub. Date: Dec. 2, 2021

(65) Prior Publication Data
US 2023/0272557 A1      Aug. 31, 2023

(30) Foreign Application Priority Data

May 29, 2020    (KR) ........................ 10-2020-0065204
Jul. 13, 2020    (KR) ........................ 10-2020-0086346
(Continued)

(51) Int. Cl.
*C08L 23/12*        (2006.01)
*C08L 67/02*        (2006.01)
(Continued)

(52) U.S. Cl.
CPC .............. *C08L 23/12* (2013.01); *C08L 67/02* (2013.01); *D01D 5/423* (2013.01); *D01F 2/28* (2013.01);
(Continued)

(58) Field of Classification Search
CPC ........ D01F 2/00; D04H 1/4382; D06M 11/83; D06M 13/188; D06M 13/503;
(Continued)

(56) References Cited

U.S. PATENT DOCUMENTS 3,997,503 A      12/1976  Henman et al.
4,374,178 A      2/1983   Kulkarni et al.
(Continued)

FOREIGN PATENT DOCUMENTS

CN        101647077 A      2/2010
CN        102317542 A      1/2012
(Continued)

OTHER PUBLICATIONS

Machine Translation of CN108589266 (Year: 2018).*
(Continued)

*Primary Examiner* — Jennifer A Steele
(74) *Attorney, Agent, or Firm* — Lerner David LLP

(57)                ABSTRACT

The present disclosure relates to fibrillated fibers and a method for preparing the same. In the present disclosure, there is provided a preparation method capable of providing fibers suitable for complexing with plastics in a more simplified process. According to the preparation method of the present disclosure, microfibers can be easily miniaturized with little energy by growing fine particles on the
(Continued)

microfibers to fibrillate the microfibers, and then applying a shear force thereto, and various physical properties can be expressed from the grown fine particles.

8 Claims, 5 Drawing Sheets

(30)     Foreign Application Priority Data

| May 31, 2021 | (KR) | .......................... 10-2021-0069785 |
|---|---|---|
| May 31, 2021 | (KR) | .......................... 10-2021-0069786 |
| May 31, 2021 | (KR) | .......................... 10-2021-0069787 |

(51)  Int. Cl.

| *D01D 5/42* | (2006.01) |
|---|---|
| *D01F 2/28* | (2006.01) |
| *D06M 11/83* | (2006.01) |
| *D06M 13/188* | (2006.01) |
| *D06M 13/503* | (2006.01) |
| *D06M 101/06* | (2006.01) |
| *D21H 11/18* | (2006.01) |

(52)  U.S. Cl.
      CPC .......... *D06M 11/83* (2013.01); *D06M 13/188* (2013.01); *D06M 13/503* (2013.01); *D21H 11/18* (2013.01); *C08L 2205/03* (2013.01); *C08L 2205/16* (2013.01); *D06M 2101/06* (2013.01); *D10B 2201/00* (2013.01); *D10B 2505/02* (2013.01)

(58)  Field of Classification Search
      CPC ...... D06M 2101/06; C08L 1/02; C08L 25/06; C08L 77/00; C08L 101/00; C08L 23/12; C08L 67/02; C08L 2205/03; C08L 2205/16; D01D 5/423; D10B 2201/00; D10B 2505/02; C08K 3/013; C08K 3/08; C08K 3/36
      See application file for complete search history.

(56)          References Cited

U.S. PATENT DOCUMENTS

| 5,536,369 | A | * | 7/1996 | Norlander .............. D21H 11/20 |
|---|---|---|---|---|
| | | | | 162/182 |
| 6,270,883 | B1 | | 8/2001 | Sears et al. |
| 6,730,249 | B2 | | 5/2004 | Sears et al. |
| 8,722,773 | B2 | | 5/2014 | Hamilton et al. |
| 9,698,336 | B2 | | 7/2017 | Kim et al. |
| 10,450,452 | B2 | | 10/2019 | Lummerstorfer et al. |
| 10,794,006 | B2 | | 10/2020 | Phipps et al. |
| 2002/0000683 | A1 | | 1/2002 | Sears et al. |
| 2006/0036012 | A1 | | 2/2006 | Hayes et al. |
| 2009/0065975 | A1 | | 3/2009 | Sain et al. |
| 2010/0203313 | A1 | | 8/2010 | Olsson et al. |
| 2011/0175252 | A1 | | 7/2011 | Liu et al. |
| 2012/0136146 | A1 | | 5/2012 | Heiskanen et al. |
| 2012/0160433 | A1 | | 6/2012 | Vehvilainen et al. |
| 2012/0208933 | A1 | | 8/2012 | Hamilton et al. |
| 2013/0209772 | A1 | * | 8/2013 | Sandstrom ........... B32B 27/306 |
| | | | | 428/220 |
| 2014/0182797 | A1 | | 7/2014 | Paltakari et al. |
| 2014/0272397 | A1 | | 9/2014 | Kim et al. |
| 2015/0357099 | A1 | | 12/2015 | Galland et al. |
| 2016/0208153 | A1 | | 7/2016 | Hede et al. |
| 2017/0058419 | A1 | | 3/2017 | Kim et al. |
| 2017/0072472 | A1 | | 3/2017 | Isogai |
| 2017/0306562 | A1 | | 10/2017 | Phipps et al. |
| 2018/0094181 | A1 | | 4/2018 | Tominaga et al. |
| 2019/0112478 | A1 | | 4/2019 | Peace et al. |
| 2019/0112479 | A1 | | 4/2019 | Peace et al. |
| 2019/0127556 | A1 | | 5/2019 | Maclean et al. |
| 2019/0241725 | A1 | | 8/2019 | Lummerstorfer et al. |
| 2020/0040531 | A1 | | 2/2020 | Thitiwutthisakul et al. |
| 2020/0062921 | A1 | | 2/2020 | Hara et al. |
| 2020/0157318 | A1 | | 5/2020 | Seo et al. |
| 2020/0199330 | A1 | | 6/2020 | Maclean et al. |
| 2020/0216624 | A1 | | 7/2020 | Hamilton et al. |
| 2020/0238333 | A1 | | 7/2020 | Itoh et al. |
| 2020/0248405 | A1 | | 8/2020 | Momin et al. |
| 2020/0306794 | A1 | | 10/2020 | Kuramochi et al. |
| 2020/0398308 | A1 | | 12/2020 | Okazaki et al. |
| 2020/0399832 | A1 | | 12/2020 | Phipps et al. |
| 2021/0025109 | A1 | * | 1/2021 | Hasegawa .............. D06M 11/83 |
| 2021/0087713 | A1 | | 3/2021 | Fukui et al. |
| 2021/0102341 | A1 | * | 4/2021 | Fukuoka ................ D21H 13/24 |
| 2021/0198463 | A1 | | 7/2021 | Ikura et al. |
| 2021/0222006 | A1 | | 7/2021 | Ono et al. |
| 2021/0261781 | A1 | | 8/2021 | Gane et al. |
| 2021/0285156 | A1 | | 9/2021 | Laleg et al. |
| 2022/0049071 | A1 | | 2/2022 | Matsusue et al. |
| 2022/0064390 | A1 | | 3/2022 | Backfolk et al. |
| 2022/0372263 | A1 | | 11/2022 | Lee et al. |
| 2023/0272557 | A1 | | 8/2023 | Park et al. |
| 2024/0166827 | A1 | | 5/2024 | Park et al. |
| 2024/0166851 | A1 | | 5/2024 | Park et al. |
| 2024/0166855 | A1 | | 5/2024 | Hwang et al. |

FOREIGN PATENT DOCUMENTS

| CN | 102378777 | A | | 3/2012 | |
|---|---|---|---|---|---|
| CN | 104031366 | A | | 9/2014 | |
| CN | 108589266 | A | * | 9/2018 | ............ D06M 11/65 |
| CN | 109162086 | A | * | 1/2019 | ............ D06M 11/44 |
| CN | 109790681 | A | | 5/2019 | |
| CN | 110041564 | A | | 7/2019 | |
| CN | 110139959 | A | | 8/2019 | |
| CN | 110382601 | A | | 10/2019 | |
| CN | 111452352 | A | | 7/2020 | |
| CN | 107793711 | B | | 9/2020 | |
| CN | 107793708 | B | | 11/2020 | |
| EP | 2236545 | A1 | | 10/2010 | |
| EP | 2554588 | A1 | | 2/2013 | |
| EP | 3441436 | A1 | | 2/2019 | |
| IN | 105531345 | A | | 4/2016 | |
| JP | H8259844 | A | | 10/1996 | |
| JP | 3194241 | B2 | | 7/2001 | |
| JP | 3704280 | B2 | | 10/2005 | |
| JP | 2010143992 | A | | 7/2010 | |
| JP | 2010221622 | A | | 10/2010 | |
| JP | 2011088997 | A | | 5/2011 | |
| JP | 2012007247 | A | | 1/2012 | |
| JP | 2012087199 | A | | 5/2012 | |
| JP | 2012532952 | A | | 12/2012 | |
| JP | 2013035903 | A | | 2/2013 | |
| JP | 2014-055323 | A | | 3/2014 | |
| JP | 2014088478 | A | | 5/2014 | |
| JP | 2015-513569 | A | | 5/2015 | |
| JP | 2015221844 | A | | 12/2015 | |
| JP | 2016176055 | A | | 10/2016 | |
| JP | 2017226754 | A | | 12/2017 | |
| JP | 2018193551 | A | | 12/2018 | |
| JP | 6446834 | B2 | | 1/2019 | |
| JP | 2019011523 | A | | 1/2019 | |
| JP | 2019500508 | A | | 1/2019 | |
| JP | 2019512591 | A | | 5/2019 | |
| JP | 2019099687 | A | | 6/2019 | |
| JP | 2019119983 | A | | 7/2019 | |
| JP | 2020007496 | A | | 1/2020 | |
| JP | 2020070379 | A | | 5/2020 | |
| JP | 6733076 | B2 | | 7/2020 | |
| JP | 2020114924 | A | | 7/2020 | |
| JP | 2022548882 | A | | 11/2022 | |
| KR | 20010075598 | A | | 8/2001 | |
| KR | 20080086976 | A | | 9/2008 | |
| KR | 20090078170 | A | | 7/2009 | |
| KR | 20110120250 | A | | 11/2011 | |
| KR | 101254784 | B1 | | 4/2013 | |
| KR | 101407092 | B1 | | 6/2014 | |
| KR | 101415636 | B1 | | 7/2014 | |
| KR | 20160062765 | A | | 6/2016 | |

(56)     References Cited

FOREIGN PATENT DOCUMENTS

| | | | | | |
|---|---|---|---|---|---|
| KR | 20170025551 | A | | 3/2017 | |
| KR | 101808014 | B1 | | 12/2017 | |
| KR | 101979185 | B1 | | 5/2019 | |
| KR | 102017583 | B1 | | 10/2019 | |
| KR | 20200115665 | A | | 10/2020 | |
| KR | 102179831 | B1 | | 11/2020 | |
| WO | WO-2013120752 | A1 | * | 8/2013 | ................ C08F 2/22 |
| WO | 2015-170613 | A1 | | 11/2015 | |
| WO | 2018105174 | A1 | | 6/2018 | |
| WO | 2019065961 | A1 | | 4/2019 | |
| WO | 2019142639 | A1 | | 7/2019 | |
| WO | 2019163873 | A1 | | 8/2019 | |
| WO | 2019203344 | A1 | | 10/2019 | |
| WO | 2020050286 | A1 | | 3/2020 | |
| WO | 2020071434 | A1 | | 4/2020 | |
| WO | 2021242069 | A1 | | 12/2021 | |
| WO | 2023018030 | A1 | | 2/2023 | |
| WO | 2023018031 | A1 | | 2/2023 | |
| WO | 2023018033 | A1 | | 2/2023 | |

OTHER PUBLICATIONS

Machine Translation of WO2013120752 (Year: 2013).*
Machine Translation of CN109162086 (Year: 2019).*
Liu Jie et al: "Soluble soybean polysaccharide/nano zine oxide antimicrobial nanocomposite films reinforced with microfibrillated cellulose", International Journal of Biological Macromolecules, Elsevier BV, NL, vol. 159, May 16, 2020 (May 16, 2020), 793-803, XP086248301.
Extended European Search Report for Application No. 22763650.3 dated Sep. 13, 2023, 8 pgs.
Extended European Search Report including Written Opinion for Application No. 21813867.5 dated Nov. 3, 2022, pp. 1-6.
Extended European Search Report including Written Opinion for Application No. 21814089.5 dated Nov. 3, 2022, pp. 1-9.
Extended European Search Report including Written Opinion for Application No. 21814301.4 dated Nov. 10, 2022, pp. 1-11.
International Search Report for Application No. PCT/KR2022/003159 mailed Jun. 27, 2022, pp. 1-3.
Sahoo, K., et al., "Study of ultraviolet sensing properties of ZnO nanoparticles grown on cellulose fibers." Materials Today: Proceedings, Aug. 31, 2019, vol. 18, pp. 1156-1161.
Search report from International Application No. PCT/KR2021/006738, mailed Aug. 30, 2021.
Vainio, U., et al., "Copper and copper oxide nanoparticles in a cellulose support studied using anomalous small-angle X-ray scattering." The European Physical Journal D, vol. 42, Published online: Jan. 31, 2007, pp. 93-101.
Sahoo, K., et al., "ZnO-cellulose Nanocomposite Powder For Application In UV Sensors." AIP Conference Process Proceedings, vol. 1832, Issue No. 1, Published online: May 23, 2017, document No. 050090, pp. 1-3.
Search report from International Application No. PCT/KR2021/006741, mailed Sep. 9, 2021.
Search report from International Application No. PCT/KR2021/006743, mailed Sep. 15, 2021.
Oromiehie, "Chemical Modification of Polypropylene by Maleic Anhydride: Melt Grafting, Characterization, and Mechanism," 2014, International Journal of Chemical Engineering and Applications, 5, 2, 117-122. (Year: 2014).

* cited by examiner

【FIG. 1A】
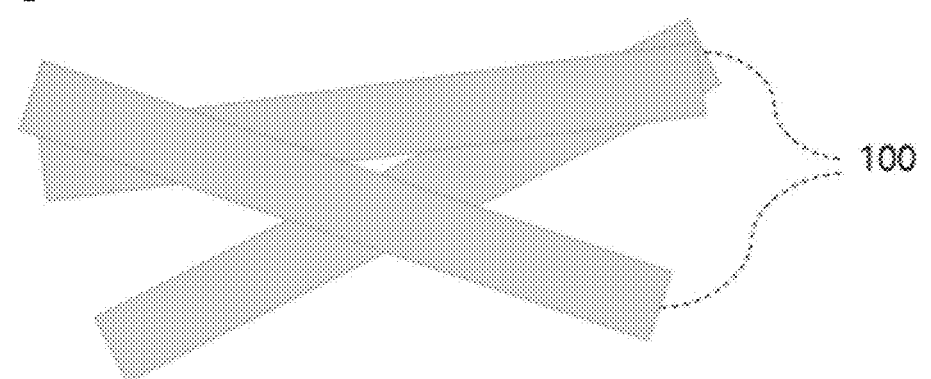
【FIG. 1B】
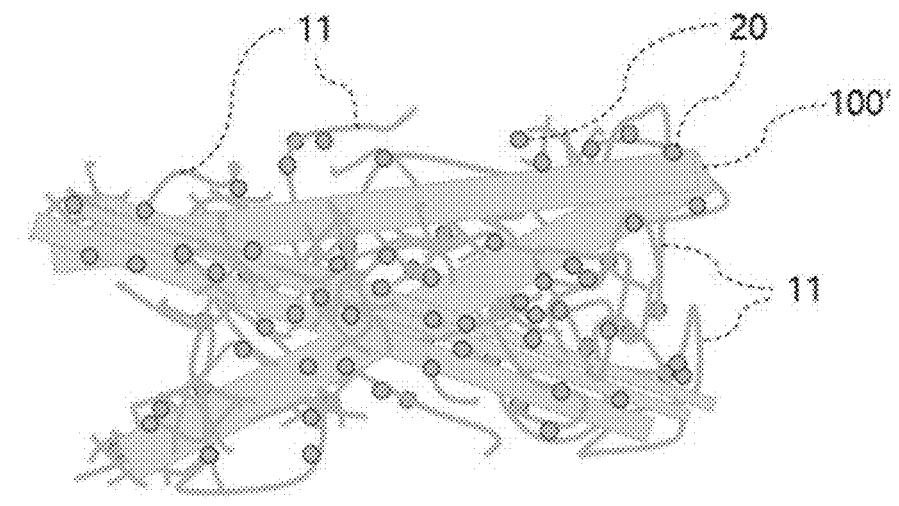

【FIG. 2】
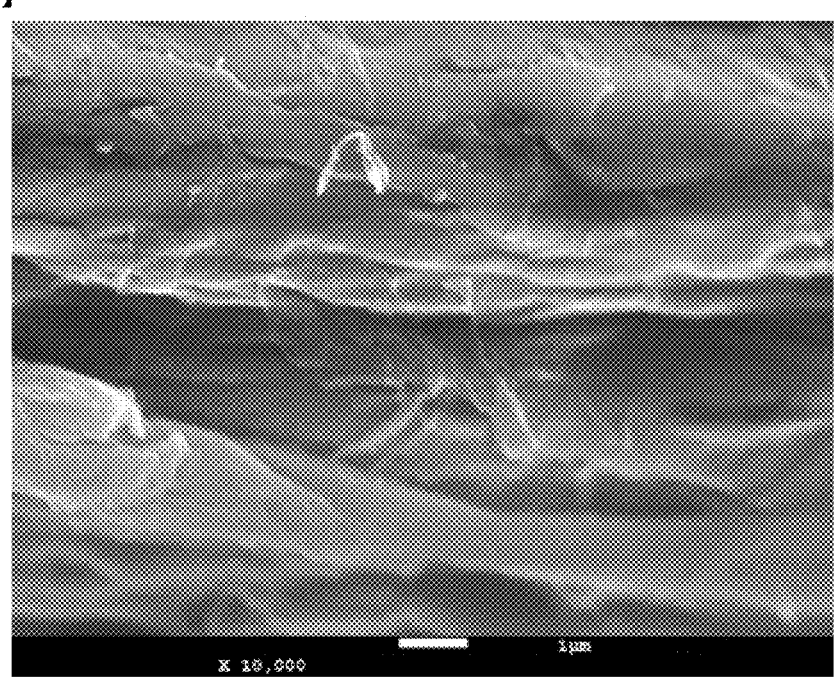
【FIG. 3】
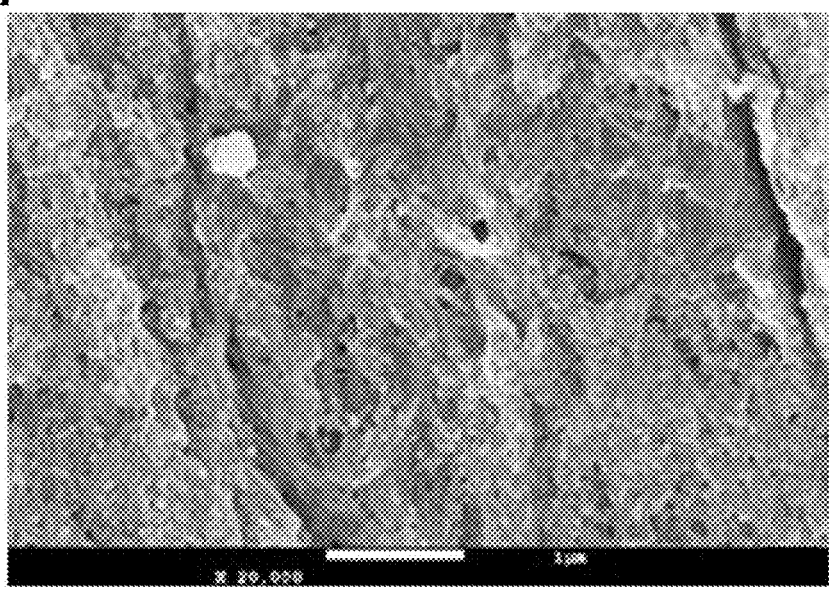

【FIG. 4】
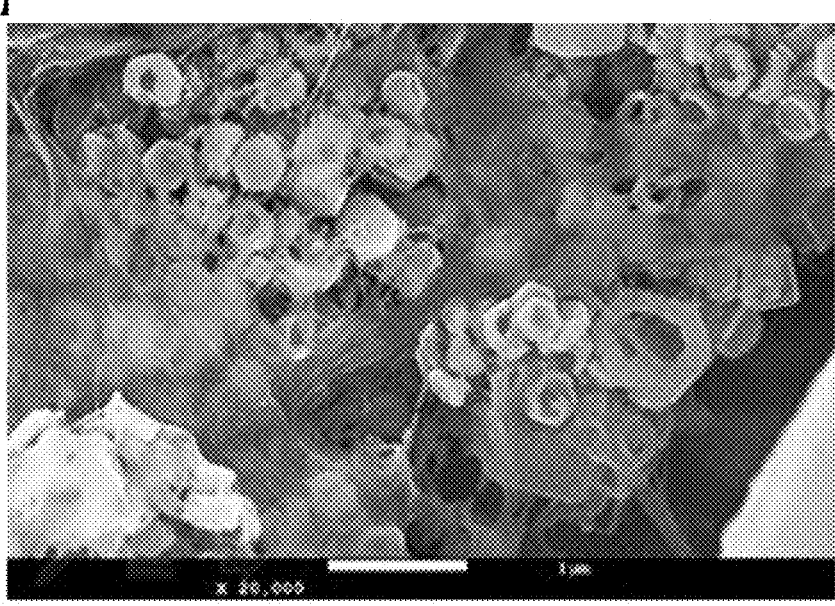
【FIG. 5】
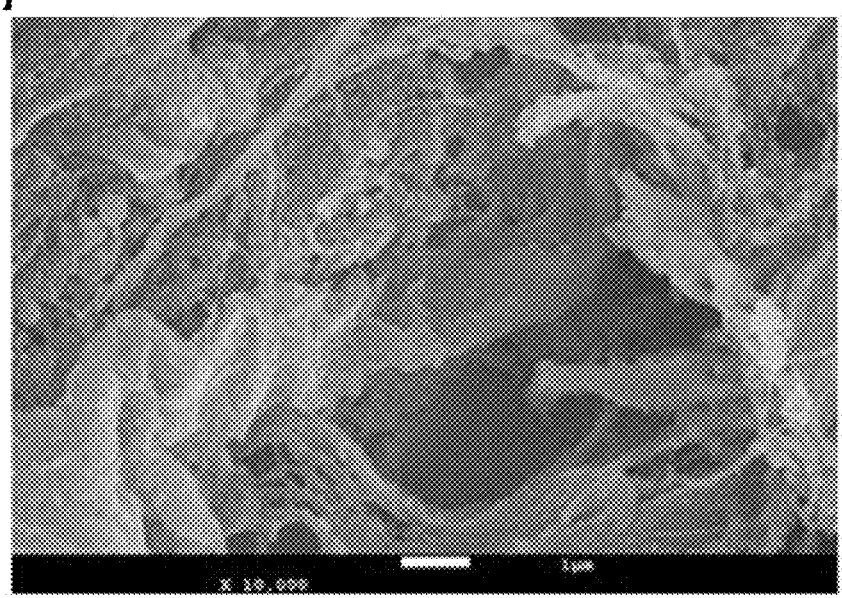

【FIG. 6A】
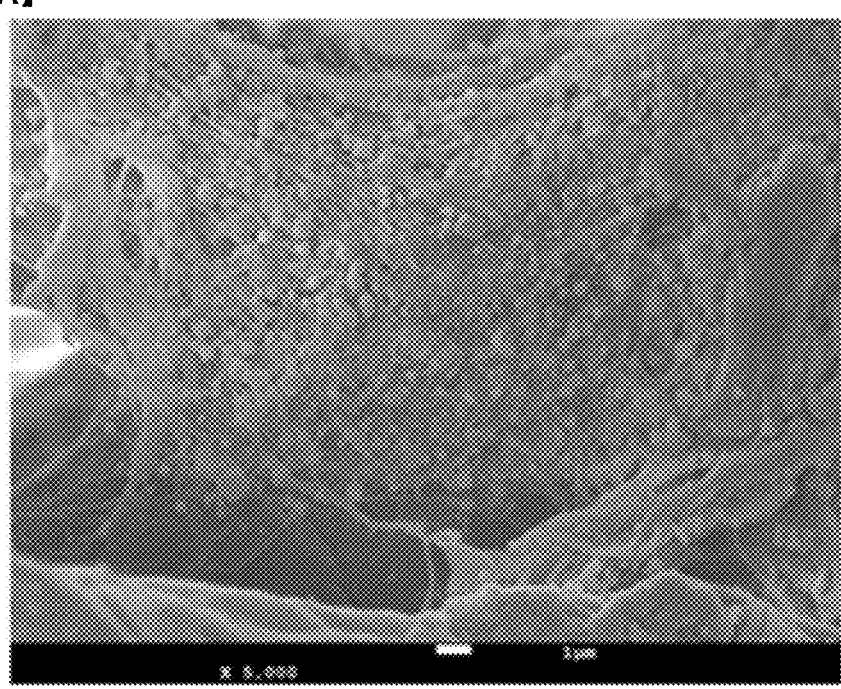
【FIG. 6B】
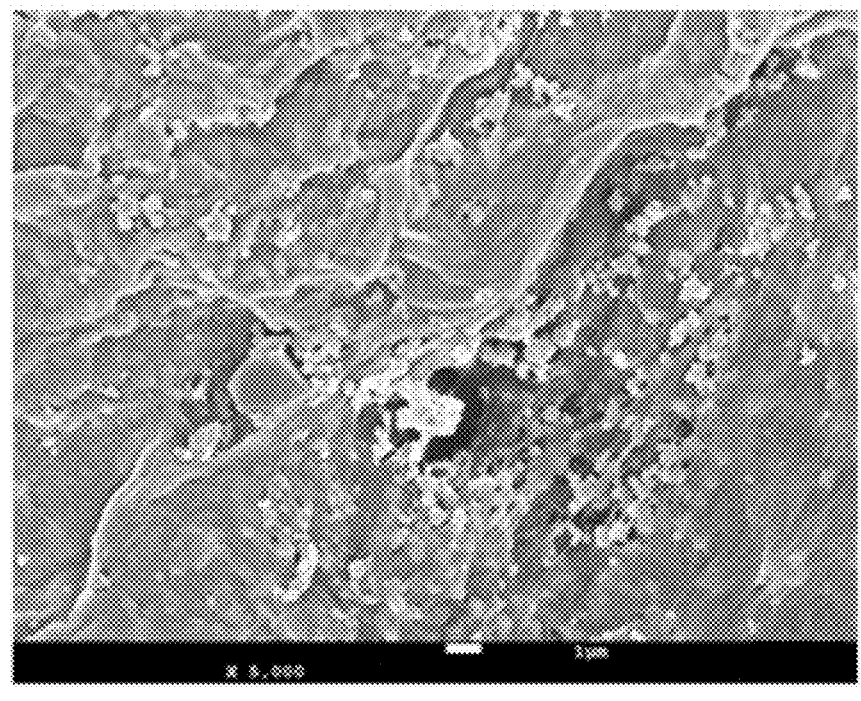

【FIG. 7A】
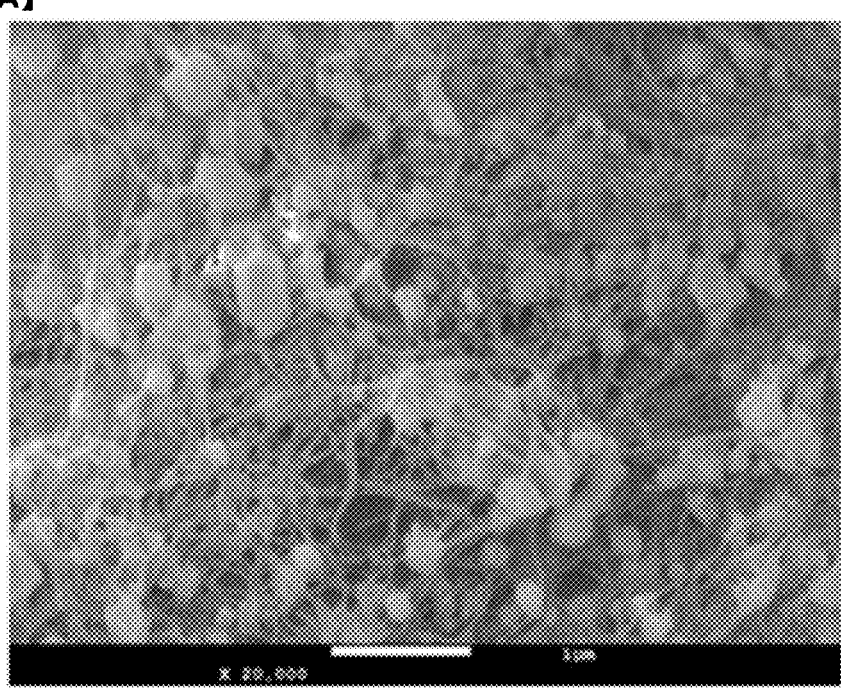
【FIG. 7B】
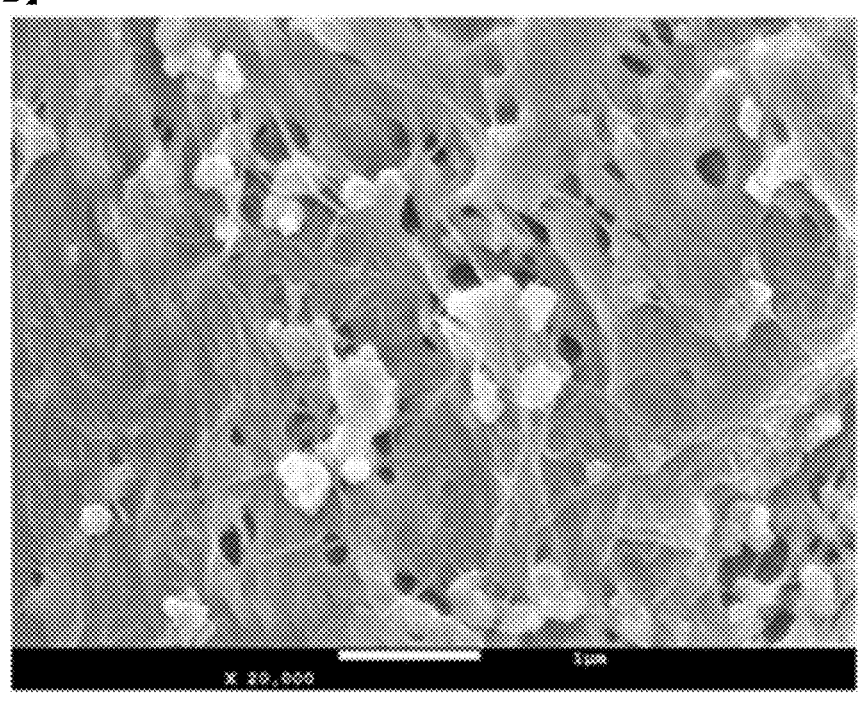

FIBRILLATED FIBER AND METHOD FOR PREPARING THE SAME

CROSS-REFERENCE TO RELATED APPLICATION(S)

The present application is a national stage entry under 35 U.S.C. § 371 of International Application No. PCT/KR2021/006738 filed on May 31, 2021, which claims priority from Korean Patent Applications No. 10-2020-0065204 filed on May 29, 2020, No. 10-2020-0086346 filed on Jul. 13, 2020, No. 10-2021-0069785 filed on May 31, 2021, No. 10-2021-0069786 filed on May 31, 2021, and No. 10-2021-0069787 filed on May 31, 2021, all the disclosures of which are incorporated herein by reference.

TECHNICAL FIELD

The present disclosure relates to fibrillated fibers and a method for preparing the same.

BACKGROUND OF ART

Cellulose is attracting attention as a polymer material with excellent mechanical properties and biodegradability. As part of this, research to provide an eco-friendly complex by complexing cellulose and plastics is in the spotlight.

However, in order to complex cellulose with plastics, complex and expensive pretreatment processes such as a solvent replacement process for changing the solvent of cellulose extract from water to an organic solvent and a modification process for imparting lipophilicity to highly hydrophilic cellulose are required.

In order to simplify the process, attempts have been made to modify and miniaturize the cellulose by applying a physical force to the untreated pulp-state cellulose. However, since the cellulose is strongly connected by hydrogen bonds in its chemical structure, there is a limitation in miniaturizing the pulp-state cellulose only by the physical force. In addition, it is difficult to sufficiently modify the pulp-state cellulose.

In addition, methods for introducing inorganic particles or introducing a separate organic group to the surface of cellulose nanofibers in order to ensure compatibility with the polymer complex are known. However, since the surface-modified cellulose nanofibers are easily aggregated in the polymer complex, it is very difficult to disperse them in the nanoscale, and thus there is a limitation in obtaining a sufficient reinforcing effect.

Accordingly, there is still a need for a method capable of providing cellulose suitable for complexing with plastics in a more simplified process.

DETAILED DESCRIPTION OF THE INVENTION

Technical Problem

In the present disclosure, there is provided a method for preparing fibrillated fibers which can provide fibers suitable for complexing with plastics in a more simplified process.

In the present disclosure, there is also provided fibrillated fibers capable of exhibiting excellent dispersibility in the complex with plastics.

Technical Solution

Hereinafter, the fibrillated fibers and the method for preparing the same according to embodiments of the present invention will be described.

The terms are used merely to refer to specific embodiments, and are not intended to restrict the present disclosure unless it is explicitly expressed.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

As used herein, 'nanofiber' or 'nanofibrils' refers to a fiber having a minor axis diameter in the nanometer range, and 'microfiber' refers to a fiber having a minor axis diameter in the micrometer range. For example, the microfiber may be composed of a bundle of the nanofibers.

As used herein, 'pulp' refers to a lignocellulosic fibrous material obtained by chemically or mechanically separating cellulose fibers from wood, fiber crops, waste paper, rags, or the like.

As used herein, 'pulp fiber', 'cellulose fiber' or 'microcellulose fiber' refers to a microfiber made of cellulose. As used herein, 'cellulose nanofiber' refers to a nanofiber made of cellulose.

As used herein, 'fibrillation' refers to a phenomenon in which nanofibrils forming the internal structure of cellulose fibers are released and raised like fluff on the cellulose fibers.

As used herein, 'fibrillated cellulose fiber' refers to a cellulose fiber in a state in which nanofibrils having a minor axis diameter in the nanometer range are raised like fluff on the cellulose fiber by the fibrillation.

I. The Method for Preparing Fibrillated Fibers

According to an embodiment of the present disclosure, there is provided a method for preparing fibrillated fibers including the steps of:

preparing a mixture containing microfibers, a fine particle precursor, and a solvent;

fibrillating the microfibers by growing fine particles on the microfibers from the fine particle precursor; and miniaturizing the microfibers by applying a shear force to the microfibers fibrillated by the growth of the fine particles.

First, a step of preparing a mixture containing microfibers, a fine particle precursor and a solvent is performed.

The preparation method according to the embodiment may provide fibrillated fibers from various microfibers. The microfibers may be microfiber aggregates in the form of pulp extracted from raw materials, microfibers obtained by dispersing microfiber aggregates in a solvent, followed by defibration, or a mixture thereof. However, the above preparation method can provide fibrillated fibers by simply and efficiently miniaturizing microfibers. Therefore, when using the microfiber aggregates in the form of pulp as the microfibers, it is possible to effectively reduce the total energy required for preparing fibrillated fibers from raw materials. Preferably, the microfibers may be fiber aggregates composed of a plurality of fibrils.

Meanwhile, cellulose fibers are biodegradable and eco-friendly natural polymer materials. However, it is known that it is complex and difficult to miniaturize the cellulose fibers due to their high hydrophilicity. However, according to the preparation method of the embodiment, the cellulose fibers can be easily miniaturized, and can be easily modified, if necessary.

When the microfibers are cellulose fibers, the microfibers may be natural cellulose fibers obtained from wood such as softwoods or hardwoods; natural cellulose fibers obtained from non-wood such as bacteria and sea squirts; regenerated cellulose fibers represented by rayon fibers and cupro fibers; or a mixture thereof.

For example, the microfibers may be pulp fibers obtained by dissolving components other than cellulose from natural raw materials such as softwoods or hardwoods using caustic soda or sodium sulfate.

In the preparation method according to the embodiment, it is possible to provide fibrillated fibers having various physical properties depending on the type of fine particles grown on the microfibers.

That is, the fine particle precursor may be appropriately selected according to physical properties to be imparted to the fibrillated fibers. For example, for the purpose of imparting antibacterial property to fibrillated fibers, a fine particle precursor capable of growing zinc oxide may be selected.

For example, the fine particle precursor may be a salt of at least one metal selected from the group consisting of copper, zinc, calcium, aluminum, iron, platinum, palladium, ruthenium, iridium, rhodium, osmium, chromium, cobalt, nickel, manganese, vanadium, molybdenum, and gallium; or a silicon oxide precursor such as tetraethyl orthosilicate (TEOS). The salt of the metal may be an acetate, chloride, or nitrate.

The fine particle precursor may be one type or two or more types.

The fine particle precursor may be contained in the mixture in an amount of 10 parts by weight or more, 20 parts by weight or more, or 40 parts by weight or more; and 150 parts by weight or less, 120 parts by weight or less, or 100 parts by weight or less based on 100 parts by weight of the microfibers. Preferably, the fine particle precursor may be contained in the mixture in an amount of 10 parts by weight to 150 parts by weight, 20 parts by weight to 150 parts by weight, 20 parts by weight to 120 parts by weight, 40 parts by weight to 120 parts by weight, or 40 parts by weight to 100 parts by weight. Within this range, sufficient fibrillation can be induced by uniformly distributing the fine particle precursor to the microfibers.

An appropriate solvent capable of dissolving the fine particle precursor and swelling the microfibers may be used as the solvent. For example, water, alcohol (e.g., lower alcohol such as methanol, ethanol, propanol or butanol), dimethyl sulfoxide (DMSO), sodium hydroxide solution, ammonia solution, urea solution, or a mixture thereof may be used.

The solvent may be used in an amount of 1000 parts by weight to 10000 parts by weight based on 100 parts by weight of the microfibers. Within this range, the microfibers are sufficiently swollen, and fluidity of the fine particle precursor is ensured, so that the fine particle precursor can be uniformly dispersed on the microfibers.

In the step of preparing the mixture, microfibers may be added after dissolving the fine particle precursor in a solvent. Then, the obtained mixture is stirred to swell the microfibers, and at the same time, the fine particle precursor is evenly distributed on the swollen microfibers and can be attached through hydrogen bonding or ionic bonding.

Meanwhile, according to an embodiment of the present disclosure, a step of fibrillating the microfibers by growing fine particles on the microfibers from the fine particle precursor is performed.

In general, fibrillation of cellulose fibers means a phenomenon in which relatively large fibrils forming a membrane of cellulose fibers and their internal tissues are released through a process such as beating, and fine fibrils are formed on the surface like fluff.

In the present disclosure, the microfibers fibrillated by the growth of the fine particles may be a fiber in which some of the fibrils forming the microfibers are released by the growth of the fine particles to form nanofibrils on the microfibers.

FIG. 1A is an enlarged schematic view of microfibers, and FIG. 1B is an enlarged schematic view of fibrillated fibers according to an embodiment of the present invention.

In FIG. 1A, the microfiber 100 is a fiber having a minor axis diameter in the micrometer range. Referring to FIG. 1B, when fine particles are grown on the microfibers by the fibrillation step, some of the fibrils forming the microfibers 100 are released by the growth of the fine particles 20, thereby forming a fiber in which nanofibrils 11 are raised on the microfibers 100' like fluff. Also, the nanofibrils 11 may be present inside the microfibers 100' through fibrillation by the growth of the fine particles 20.

Preferably, in the microfibers fibrillated by the growth of the fine particles, the microfibers may have a minor axis diameter of 1 μm or more; and 30 μm or less, 25 μm or less, 20 μm or less, 15 μm or less, or 10 μm or less. Specifically, the microfibers may have a minor axis diameter of 1 μm to 30 μm, 1 μm to 25 μm, 1 μm to 20 μm, 1 μm to 15 μm, or 1 μm to 10 μm.

And, in the microfibers fibrillated by the growth of the fine particles, the nanofibrils may have a minor axis diameter of 10 nm or more, 20 nm or more, 30 nm or more, 50 nm or more, or 50 nm or more; and 400 nm or less, 350 nm or less, 300 nm or less, 250 nm or less, 200 nm or less, 150 nm or less, or 100 nm or less. Specifically, the nanofibrils may have a minor axis diameter of 10 nm to 400 nm, 10 nm to 350 nm, nm to 300 nm, 20 nm to 300 nm, 20 nm to 250 nm, 30 nm to 250 nm, 30 nm to 200 nm, 40 nm to 200 nm, 40 nm to 150 nm, 50 nm to 150 nm, or 50 nm to 100 nm.

For example, the microfibers fibrillated by the growth of the fine particles may include microcellulose fibers including nanofibrils and fine particles.

Herein, the nanofibrils may be bonded to a surface of the microcellulose fibers. In addition, the nanofibrils may be present inside the microcellulose fibers. In addition, the fine particles may be bonded to the nanofibrils or bonded to a surface or inside of the microcellulose fibers.

In the step of fibrillating the microfibers, a reducing agent, a catalyst, a ligand or a mixture thereof may be added to the mixture to grow fine particles on the microfibers from the fine particle precursor.

Herein, the type and content of the reducing agent, catalyst, and ligand may be appropriately selected according to the added fine particle precursor, and the type and content of the fine particles to be grown. For example, the reducing agent may be sodium hydroxide (NaOH), a metal hydride-based reducing agent, a borohydride-based reducing agent, a borane-based reducing agent, a silane-based reducing agent, a hydrazine-based reducing agent, or a hydrazide-based reducing agent. As the catalyst, ammonia or urea may be used. As the ligand, benzene-1,3,5-tricarboxylate (BTC) may be used.

In the step of fibrillating the microfibers, the fine particles grown on the microfibers from the fine particle precursor may have a minor axis diameter of 0.01 μm or more, 0.03 μm or more, or 0.05 μm or more; and 10 μm or less, 7 μm or less, or 5 μm or less. Preferably, the fine particles may have a minor axis diameter of 0.01 μm to 10 μm, 0.03 μm to 7 μm, or 0.05 μm to 5 μm.

The fibrillated microfibers can be easily miniaturized with little energy through a subsequent miniaturizing process, thereby efficiently providing fibrillated fibers. However, when the size of the fine particles on the fibrillated microfibers is too large, the fine particles may act as defects, thereby reducing mechanical properties of the complex including the fibrillated fiber.

The fine particles may be spherical fine particles having a diameter of 0.01 μm to 10 μm. In addition, the fine particles may be columnar fine particles having a diameter of 0.01 μm to 10 μm on one axis and a diameter of 0.01 μm to 10 μm on another axis. The diameter of the fine particles may be measured using a scanning electron microscope. As a non-limiting example, the diameters, minor axis diameters, or major axis diameters of 20 fine particles are measured using a scanning electron microscope, respectively, and then an average value calculated by excluding the maximum and minimum values is obtained.

Optionally, after growing the fine particles on the microfibers, a step of modifying the fine particles may be performed.

For example, a process of modifying the fine particles by adding a lipophilic compound having a thiol group after growing the fine particles on the microfibers may be additionally performed. By modifying the fine particles to be lipophilic, compatibility between the fibrillated microfibers and the organic material may be further improved. Examples of the lipophilic compound having a thiol group include 1-decanethiol, 1-undecanethiol, 1-dodecanethiol, 1-tetradecanethiol, 1-pentadecanethiol, 1-hexadecanethiol, 1-octadecanethiol, and the like.

Meanwhile, according to an embodiment of the present disclosure, a step of miniaturizing the microfibers by applying a shear force to the microfibers fibrillated by the growth of the fine particles is performed.

The fibrillated microfibers obtained through the fibrillation process may be manufactured into fibrillated fibers through the miniaturizing process.

In the miniaturizing process, a shear force is applied to the fibrillated microfibers as shown in FIG. 1B to miniaturize the fibrillated microfibers. When the microfibers are fibrillated by growing fine particles on the microfibers before the miniaturizing process, the fibrillated fibers can be easily provided with little energy.

Specifically, in the miniaturizing process, a mechanical shear force may be applied to the fibrillated microfibers using a known kneader to miniaturize the microfibers. As a non-limiting example, the kneader includes an extruder (e.g., single-screw extruder or twin-screw extruder), a ball mill, a roll mill, a cutter mill, a planetary mill, a bead mill, a jet mill, an ultrasonic homogenizer, a Banbury mixer, a grinder, a pressure kneader, a double roll mill, and the like.

For example, when a mechanical shear force is applied through a twin-screw extruder in the miniaturizing process, the screw rotation speed may be controlled to 100 rpm to 500 rpm.

This miniaturizing process may provide fibrillated fibers.

II. The Fibrillated Fiber

According to another embodiment of the present disclosure, there are provided fibrillated fibers including nanofibrils and fine particles.

The fibrillated fibers contain microcellulose fibers including nanofibrils and fine particles. Herein, the nanofibrils may be bonded to a surface of the microcellulose fibers, and the fine particles may be bonded to the nanofibrils or bonded to a surface or inside of the microcellulose fibers.

FIG. 1B is an enlarged schematic view of fibrillated fibers according to an embodiment of the present invention. Referring to FIG. 1B, in the fibrillated fibers, nanofibrils 11 are bonded to a surface of the microcellulose fibers 100' like fluff, and the fine particles 20 may be bonded to the nanofibrils 11 or bonded to a surface or inside of the microcellulose fibers 100'.

Preferably, in the microcellulose fibers including nanofibrils and fine particles, the microfibers may have a minor axis diameter of 1 μm or more; and 30 μm or less, 25 JIM or less, 20 μm or less, 15 μm or less, or 10 μm or less. Specifically, the microfibers may have a minor axis diameter of 1 μm to 30 μm, 1 μm to 25 μm, 1 μm to 20 μm, 1 μm to 15 μm, or 1 μm to 10 μm.

And, in the microfibers fibrillated by the growth of the fine particles, the nanofibrils may have a minor axis diameter of 10 nm or more, 20 nm or more, 30 nm or more, 50 nm or more, or 50 nm or more; and 400 nm or less, 350 nm or less, 300 nm or less, 250 nm or less, 200 nm or less, 150 nm or less, or 100 nm or less. Specifically, the nanofibrils may have a minor axis diameter of 10 nm to 400 nm, 10 nm to 350 nm, nm to 300 nm, 20 nm to 300 nm, 20 nm to 250 nm, 30 nm to 250 nm, 30 nm to 200 nm, 40 nm to 200 nm, 40 nm to 150 nm, 50 nm to 150 nm, or 50 nm to 100 nm.

The fine particles may have a minor axis diameter of 0.01 μm or more, 0.03 μm or more, or 0.05 μm or more; and 10 μm or less, 7 μm or less, or 5 μm or less. Preferably, the fine particles may have a minor axis diameter of 0.01 μm to 10 μm, 0.03 μm to 7 μm, or 0.05 μm to 5 μm.

The fine particles may be spherical fine particles having a diameter of 0.01 μm to 10 μm. In addition, the fine particles may be columnar fine particles having a diameter of 0.01 μm to 10 μm on one axis and a diameter of 0.01 μm to 10 μm on another axis.

According to an embodiment of the present disclosure, the fine particles may be included in an amount of 1 part by weight or more, 5 parts by weight or more, 8 parts by weight or more, or 10 parts by weight or more; and 30 parts by weight or less, 25 parts by weight or less, or 20 parts by weight or less based on 100 parts by weight of the microcellulose fibers. Preferably, the fine particles may be included in an amount of 1 to 30 parts by weight, 5 to 30 parts by weight, 5 to 25 parts by weight, 8 to 25 parts by weight, 10 to 25 parts by weight, or 10 to 20 parts by weight based on 100 parts by weight of the microcellulose fibers.

In order to sufficiently express the fibrillation effect of the microcellulose fibers by the growth of fine particles, the fine particles are preferably included in an amount of 1 part by weight or more, 5 parts by weight or more, or 10 parts by weight or more based on 100 parts by weight of the microcellulose fibers.

However, when the fine particles are included in an excessive amount on the microcellulose fibers, compatibility with the polymer matrix may be reduced, and thus mechanical properties of the polymer complex may be deteriorated. In addition, when the fine particles are included in an excessive amount, the fine particles are aggregated to form a non-uniform aggregate, and thus various physical properties may be deteriorated. Therefore, the fine particles are preferably included in an amount of 30 parts by weight or less, 25 parts by weight or less, or 20 parts by weight or less based on 100 parts by weight of the microcellulose fibers.

Preferably, the fibrillated fibers can be obtained according to the above-described [I. The method for preparing fibrillated fibers].

Advantageous Effects

There is provided a preparation method capable of providing fibers suitable for complexing with plastics in a more simplified process. According to the preparation method of the present disclosure, microfibers can be easily miniaturized with little energy by growing fine particles on the microfibers to fibrillate the microfibers, and then applying a shear force thereto, and various physical properties can be expressed from the grown fine particles.

BRIEF DESCRIPTION OF THE DRAWINGS

FIG. 1A is an enlarged schematic view of microfibers, and FIG. 1B is an enlarged schematic view of fibrillated fibers according to an embodiment of the present invention.

FIG. 2 is a scanning electron microscope (SEM) image of pulp fibers used in Example 1.

FIG. 3 is a SEM image of fibrillated fibers obtained in Example 1.

FIG. 4 is a SEM image of fibrillated fibers obtained in Example 2.

FIG. 5 is a SEM image of fibrillated fibers obtained in Example 3.

FIG. 6A shows a comparison of SEM images of fibrillated fibers according to Example 2, and FIG. 6B shows a comparison of SEM images of miniaturized cellulose complexed with fine particles according to Comparative Example 2.

FIG. 7A is a comparison of SEM images of FIG. 6A taken at a higher magnification, and FIG. 7B is a comparison of SEM images of FIG. 6B taken at a higher magnification.

DESCRIPTION OF SYMBOLS

100, 100': microfiber
11: nanofibril
20: fine particle

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

EXAMPLE 1

Softwood kraft pulp fibers were prepared as cellulose raw materials. Then, the shape of the pulp fibers was observed using a scanning electron microscope (SEM image of FIG. 2).

20 g of the above pulp fibers (microfibers) were added to 1 L of a 0.05 M aqueous solution in which 9.08 g (0.05 mol) of copper acetate was dissolved in distilled water, and stirred at 500 rpm for 2 hours to prepare a mixture. In this mixture, copper acetate was attached to the swollen pulp fibers through hydrogen bonding or ionic bonding.

0.05 mol of benzene-1,3,5-tricarboxylate (BTC) was added to the mixture at room temperature, and stirred at 500 rpm for 2 hours to grow fine particles on the pulp fibers. As shown in FIG. 3, FIG. 6A, and FIG. 7A, it was confirmed using a scanning electron microscope that fibrillation occurred in the pulp fiber portion on which particles (HKUST-1: Cu-BTC) were grown.

Thereafter, the fibrillated pulp fibers were introduced into a twin-screw extruder (BAutek, BA-11), and then extruded to obtain fibrillated fibers. At this time, a screw diameter of the twin-screw extruder was adjusted to 11 mm, L/D (ratio of screw diameter D and kneading block length L) was adjusted to 40, and a screw rotation speed was adjusted to 200 rpm.

EXAMPLE 2

20 g of the same pulp fibers as in Example 1 were added to an aqueous solution in which 20 g of zinc acetate was dissolved in 1000 g of distilled water, and stirred at 500 rpm for 2 hours to prepare a mixture. In this mixture, zinc acetate was attached to the swollen pulp fibers through hydrogen bonding or ionic bonding.

3.6 g of sodium hydroxide (NaOH) was added to the mixture at room temperature, and stirred at 500 rpm for 2 hours to grow fine particles on the pulp fibers. As shown in FIG. 4, it was confirmed using a scanning electron microscope that fibrillation occurred in the pulp fiber portion on which particles (ZnO) were grown.

Thereafter, a shear force was applied to the fibrillated pulp fibers in the same manner as in Example 1 to obtain fibrillated fibers by miniaturization.

EXAMPLE 3

20 g of the same pulp fibers as in Example 1 were added to an aqueous solution in which 10 g of tetraethyl orthosilicate (TEOS) was dissolved in a mixed solvent of 200 g of distilled water and 800 g of ethanol, and stirred at 500 rpm for 2 hours to prepare a mixture. In this mixture, tetraethyl orthosilicate was attached to the swollen pulp fibers through hydrogen bonding or ionic bonding.

1000 g of 1 wt % ammonia solution was added to the mixture as a catalyst at room temperature, and stirred at 500 rpm for 2 hours to grow fine particles on the pulp fibers. As shown in FIG. 5, it was confirmed using a scanning electron microscope that fibrillation occurred in the pulp fiber portion on which particles (SiO) were grown.

Thereafter, a shear force was applied to the fibrillated pulp fibers in the same manner as in Example 1 to obtain fibrillated fibers by miniaturization.

EXAMPLE 4

Fibrillated fibers were prepared in the same manner as in Example 2, except that 1 g of 1-octadecanethiol was added to the fibrillated pulp fibers to modify the pulp fibers to be lipophilic, and then a miniaturizing process was performed in Example 2.

COMPARATIVE EXAMPLE 1

The same softwood kraft pulp fibers as in Example 1 were prepared as cellulose raw materials. Cellulose fibers were prepared in the same manner as in Example 1, except that pulp fibers were extruded by putting them into a twin-screw extruder without growing fine particles on the pulp fibers.

COMPARATIVE EXAMPLE 2

The same softwood kraft pulp fibers as in Example 1 were prepared as cellulose raw materials. A surface of the pulp fibers was oxidized using 2,2,6,6-tetramethylpiperidinyl-1-oxyradical (TEMPO) as a catalyst to obtain oxidized pulp.

1 g of the oxidized pulp was dispersed in 99 g of distilled water and miniaturized (defibrated) with a mixer for 30 minutes to obtain an aqueous dispersion of miniaturized cellulose at a concentration of 1%.

A zinc acetate aqueous solution was prepared by dissolving 20 g of zinc acetate in 1000 g of distilled water. 3.6 g of sodium hydroxide (NaOH) was dissolved in 10 ml of distilled water to prepare a sodium hydroxide solution.

While stirring 100 g of the aqueous dispersion of miniaturized cellulose at 15° C., 50 ml of the zinc acetate aqueous solution and 10 ml of the sodium hydroxide solution were added thereto, followed by stirring at 500 rpm for 2 hours to prepare a complex of zinc oxide (ZnO) particles and miniaturized cellulose.

As shown in FIG. 6B and FIG. 7B, it was confirmed using a scanning electron microscope that the complex of Comparative Example 2 had strong bonding strength and aggregation between the miniaturized celluloses, so that the miniaturized celluloses were aggregated and the dispersion of particles was low.

TEST EXAMPLES

The physical properties of the fibers prepared in Examples and Comparative Examples were evaluated by the following method, and the results are shown in Table 1 below.
1) Minor Axis Diameter of Fiber
The minor axis diameter of the fiber (the shortest diameter in the cross section of fiber) was measured using a scanning electron microscope.

Specifically, in the case of fibrillated fibers, the minor axis diameters of 10 microfibers per each sample were measured and displayed in a range excluding the maximum and minimum values. In the case of nanofibrils, the minor axis diameters of nanofibrils per each sample were measured, and displayed in a range excluding the maximum and minimum values.

However, since Comparative Example 1 did not undergo a fibrillation process unlike Examples, the minor axis diameter of the microfibers of Comparative Example 1 is the minor axis diameter of the non-fibrillated pulp fiber, and the minor axis diameter of the nanofibrils is the minor axis diameter of the nanofibers formed by the extrusion.

In addition, in Comparative Example 2, the pulp fibers were miniaturized (defibrated), and then complexed with particles unlike Examples. The minor axis diameter of nanofibrils of Comparative Example 2 in Table 1 below means the minor axis diameter of the miniaturized cellulose after complexing with particles.
2) Size of Fine Particles
The minor axis diameters of 20 fine particles per each sample were measured using a scanning electron microscope, and displayed in a range excluding the maximum and minimum values.
3) Antibacterial Property
The antibacterial property was evaluated by modifying KS K 0693, an antibacterial test standard, to be suitable for evaluating the antibacterial property of fibers. Specifically, 4 mL of 106 CFU bacteria (1×PBS 4 mL, 40 μL of bacteria with OD 600 nm=1) was added to 0.4 g of a chopped sample in a 50 mL conical tube. A control specimen was prepared by adding 0.4 g of the fibers of Comparative Example 1. As a strain, *Escherichia coli*, gram-negative bacteria, was used. The prepared sample was suspension-cultured at 36±1° C. for 24 hours using a shaking incubator. After the bacterial culture was completed, 16 mL of 1×PBS was added and diluted 5 times, followed by vortexing for 1 hour. After the vortexing was completed, 100 μL at a time was inoculated into agar solid medium. Then, it was smeared until absorbed into the medium using a spreader or glass beads. The solid medium was subjected to stationary culture at 36±1° C. for 24 hours. The colonies of each Petri dish were counted and recorded. Then, the bacteriostatic rate was obtained by calculating how many percent the number of colonies of the antibacterial sample was reduced compared to the control specimen.
4) Deodorizing Property
5 to 10 ppm of each of acetic acid, ammonia, acetaldehyde and formaldehyde gas was flowed into a glass tube containing 50 mg of the sample of Example 1 using a standard gas generator at a rate of 150 mL/min in a total of 10 L. Then, the gas concentration after passing through the sample was quantitatively analyzed in real time using a shift mass device (SYFT Technologies, VOICE200 ultra). And, the ratio of the gas removed by the sample of Example 1 to the gas supplied to the sample was calculated and shown in Table 2.

TABLE 1

|  | Minor axis diameter | | | |
|  | Micro-fibers (μm) | Nano-fibrils (nm) | Size of fine particles (μm) | Antibacterial property (%) |
| --- | --- | --- | --- | --- |
| Example 1 | 1~10 | 50~100 | 0.05~0.1 | 99.0 |
| Example 2 | 1~10 | 50~100 | 0.1~1 | 99.0 |
| Example 3 | 1~10 | 50~100 | 0.03~0.1 | — |
| Example 4 | 1~10 | 50~100 | 0.1~1 | 99.0 |
| Comparative Example 1 | 5~10 | 500~1000 | — | — |
| Comparative Example 2 | — | 10~100 | 0.1~1 | — |

TABLE 2

| Example 1 | Acetic Acid | Ammonia | Acetaldehyde | Formaldehyde |
| --- | --- | --- | --- | --- |
| Gas removal (%) | 93 | 94 | 94 | 95 |

Referring to Table 1, it was confirmed in Examples 1 to 4 that pulp fibers could be further miniaturized even under the same shear force as in Comparative Example 1 by growing fine particles to fibrillate before applying a shear force to the pulp fibers, and at the same time, physical properties such as antibacterial property could be imparted.

In addition, referring to Table 2, it was confirmed that various physical properties such as deodorizing property could be additionally imparted depending on the type of fine particles grown on the pulp fibers as in Example 1.

In the case of Comparative Example 2, the short axis diameter of the miniaturized cellulose formed by miniaturization (defibration) was equal to or smaller than that of nanofibrils of Examples, but the bonding force and aggregation between miniaturized celluloses were strong, so that the miniaturized celluloses were aggregated and the dispersion degree of particles was low.

The invention claimed is:
1. A method for preparing fibrillated fibers, the method comprising the steps of:
preparing a mixture comprising microfibers, a fine particle precursor, and a solvent;
fibrillating the microfibers by growing fine particles on the microfibers from the fine particle precursor by adding a reducing agent, a catalyst, a ligand or a mixture thereof to the mixture and then stirring; and
miniaturizing the microfibers by applying a shear force to the microfibers fibrillated by the growth of the fine particles, wherein the microfibers are cellulose fibers, the microfibers fibrillated by the growth of the fine particles contain microcellulose fibers comprising nanofibrils and the fine particles, the nanofibrils are bonded to a surface of the microcellulose fibers, and the fine particles are bonded to the nanofibrils or bonded to a surface or inside of the microcellulose fibers, and the mixture comprises 40 to 100 parts by weight of the fine particle precursor and 1000 to 10000 parts by weight of the solvent based on 100 parts by weight of the microfibers, wherein in the step of preparing the mixture, the microfibers are added after dissolving the fine particle precursor in the solvent.

2. The method for preparing fibrillated fibers of claim 1, wherein the fine particle precursor comprises an acetate, chloride, or nitrate of at least one metal selected from the group consisting of copper, zinc, calcium, aluminum, iron, platinum, palladium, ruthenium, iridium, rhodium, osmium, chromium, cobalt, nickel, manganese, vanadium, molybdenum, and gallium; or a silicon oxide precursor.

3. The method for preparing fibrillated fibers of claim 1, wherein the solvent is water, alcohol, dimethyl sulfoxide, sodium hydroxide solution, ammonia solution, urea solution, or a mixture thereof.

4. The method for preparing fibrillated fibers of claim 1, wherein in the step of fibrillating the microfibers, the fine particles grown on the microfibers from the fine particle precursor have a minor axis diameter of 0.01 μm to 10 μm.

5. The method for preparing fibrillated fibers of claim 1, wherein the microcellulose fibers have a minor axis diameter of 1 μm to 30 μm, and the nanofibrils have a minor axis diameter of 10 nm to 400 nm.

6. The method for preparing fibrillated fibers of claim 1, further comprising a step of modifying the fine particles by adding a lipophilic compound having a thiol group after growing the fine particles on the microfibers.

7. The method for preparing fibrillated fibers of claim 6, wherein the lipophilic compound having a thiol group is 1-decanethiol, 1-undecanethiol, 1-dodecanethiol, 1-tetradecanethiol, 1-pentadecanethiol, 1-hexadecanethiol, or 1-octadecanethiol.

8. The method for preparing fibrillated fibers of claim 1, wherein the reducing agent is sodium hydroxide, a metal hydride-based reducing agent, a borohydride-based reducing agent, a borane-based reducing agent, a silane-based reducing agent, a hydrazine-based reducing agent, or a hydrazide-based reducing agent, the catalyst is ammonia or urea, and the ligand is benzene-1,3,5-tricarboxylate (BTC).

* * * * *